(12) United States Patent
Shi et al.

(10) Patent No.: US 12,460,309 B2
(45) Date of Patent: Nov. 4, 2025

(54) DIRECT ELECTROCHEMICAL EXTRACTION OF LITHIUM FROM ORES

(71) Applicant: The Penn State Research Foundation, University Park, PA (US)

(72) Inventors: Feifei Shi, University Park, PA (US); Hanrui Zhang, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 18/861,704

(22) PCT Filed: May 16, 2023

(86) PCT No.: PCT/US2023/022350
§ 371 (c)(1),
(2) Date: Oct. 30, 2024

(87) PCT Pub. No.: WO2023/224970
PCT Pub. Date: Nov. 23, 2023

(65) Prior Publication Data
US 2025/0109517 A1    Apr. 3, 2025

Related U.S. Application Data

(60) Provisional application No. 63/364,850, filed on May 17, 2022.

(51) Int. Cl.
*C25C 3/02*     (2006.01)
*C22B 3/04*     (2006.01)
*C25C 7/02*     (2006.01)

(52) U.S. Cl.
CPC ............... *C25C 3/02* (2013.01); *C22B 3/045* (2013.01); *C25C 7/02* (2013.01)

(58) Field of Classification Search
CPC .................................................... C22B 3/045
See application file for complete search history.

(56) References Cited

U.S. PATENT DOCUMENTS

| | | | |
|---|---|---|---|
| 6,927,001 | B1 | 8/2005 | Hamamoto et al. |
| 2011/0056331 | A1* | 3/2011 | Dixon ....................... C25C 1/12 75/731 |

(Continued)

FOREIGN PATENT DOCUMENTS

| | | |
|---|---|---|
| CN | 113528860 A | 10/2021 |
| CN | 113549775 A | 10/2021 |

OTHER PUBLICATIONS

Diaz et al, Electrochemical-assisted leaching of active materials from lithium ion batteries, Idaho National Laboratory, Oct. 2020, pp. 1-26, available online at https://www.osti.gov/servlets/purl/1778172 (Year: 2020).*

(Continued)

*Primary Examiner* — Harry D Wilkins, III
(74) *Attorney, Agent, or Firm* — Buchanan Ingersoll & Rooney PC

(57) ABSTRACT

Disclosed is a method for leaching lithium via an electrochemical apparatus including a multi-functional current collector, an electrode, an electrolyte, and a lithium-bearing material, wherein the lithium-bearing material is dispersed or suspended in the electrolyte or the lithium-bearing material is coated onto the current collector. The method involves applying voltage to the current collector to leach lithium from the lithium-bearing material. The method can involve adding promoter additive into the electrolyte to boost lithium extraction within the electrochemical apparatus.

12 Claims, 20 Drawing Sheets

(56) References Cited

U.S. PATENT DOCUMENTS

2021/0391605 A1    12/2021  Wang et al.
2022/0223932 A1*  7/2022  McNally ............... H01M 10/54

OTHER PUBLICATIONS

Martens et al, Toward a more sustainable mining future with electrokinetic in situ leaching, Science Advances, vol. 7, No. 18, Apr. 2021, pp. 1-10 (Year: 2021).*
International Search Report for PCT/US2023/022350 dated Sep. 6, 2023.
Written Opinion of the International Searching Authority for PCT/US2023/022350 dated Sep. 6, 2023.
M. Skyllas-Kazacos et al., "Progress in Flow Battery Research and Development" Journal of The Electrochemical Society, 2011 J. Electrochem. Soc. 158 R55.

* cited by examiner

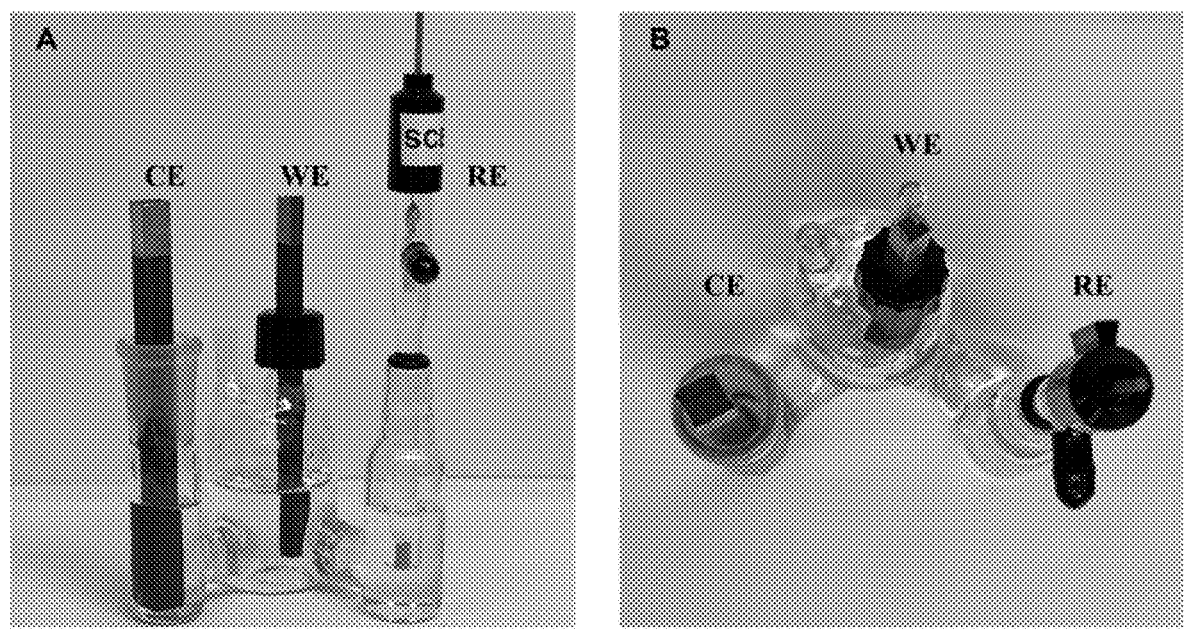
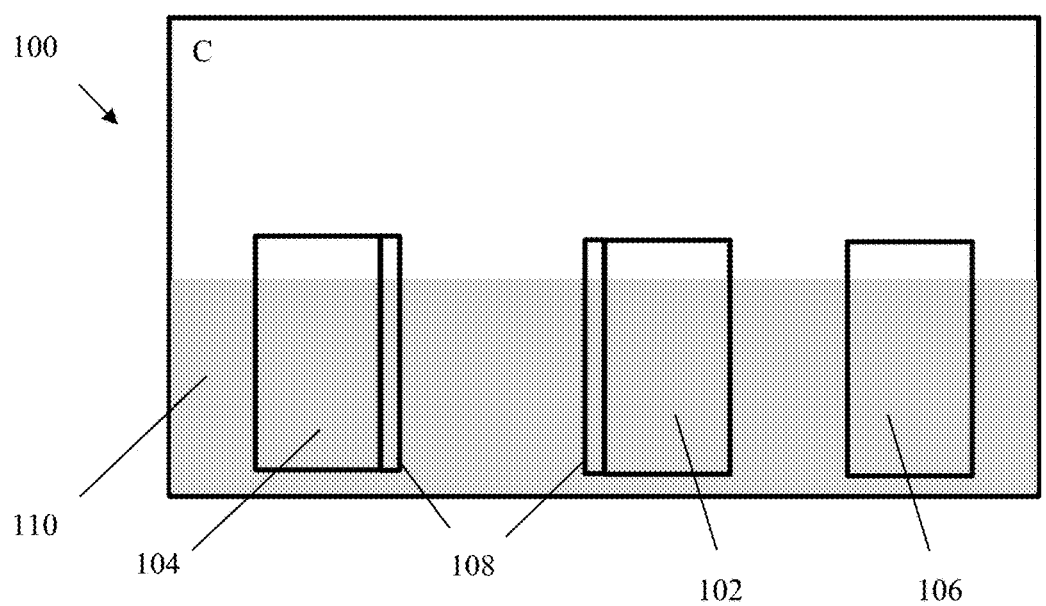
FIG. 1

```
┌─────────────────────────────────────────────────────────┐
│  Provide an electrochemical apparatus including: a multi-│
│  functional current collector; an electrode; an electrolyte; and│
│     a lithium-bearing material, wherein the lithium-bearing│
│     material is dispersed or suspended in the electrolyte or the│
│    lithium-bearing material is coated onto the current collector│
└─────────────────────────────────────────────────────────┘
                              │
                              ▼
┌─────────────────────────────────────────────────────────┐
│   Add an oxidant promoter to the electrolyte to increase the│
│    amount or rate of electron conduction and/or to lower the│
│       reaction potential of the electrochemical apparatus│
└─────────────────────────────────────────────────────────┘
                              │
                              ▼
┌─────────────────────────────────────────────────────────┐
│  Apply voltage to the current collector to leach lithium from│
│                the lithium-bearing material              │
└─────────────────────────────────────────────────────────┘
```

FIG. 2

DIRECT ELECTROCHEMICAL EXTRACTION OF LITHIUM FROM ORES

CROSS-REFERENCE TO RELATED APPLICATIONS

This patent application is a U.S. national stage application under 35 U.S.C. § 371 for International Patent Application No. PCT/US2023/022350, filed on May 16, 2023, which is related to and claims the benefit of priority to U.S. provisional patent application No. 63/364,850 filed on May 17, 2022, the entire contents of each is incorporated herein by reference.

FIELD OF THE INVENTION

Embodiments relate to a method of electrochemical lithium extraction from ore sources involving applying voltage to a current collector to extract lithium within an electrochemical apparatus so as to leach lithium from lithium-bearing material. The disclosed methods are more energy-efficient and do not require heating to generate phase transformation.

BACKGROUND OF THE INVENTION

Since the commercialization and the wide application of electric vehicles (EVs), the demand of critical elements for energy storage like lithium has significantly increased. Meanwhile, the price of typical lithium chemicals, e.g., lithium carbonate, has increased five times within 2021. In order to boost the lithium supply and stabilize its cost, exploring more resources and extraction methods to produce lithium chemicals are urgent. Currently, over 70% of the lithium-bearing chemicals are harvested from brines. However, they originated from only small geological areas, like Argentina, Chile, and China. Furthermore, this method needs large footprint, lengthy time, and will cause soil pollution. Besides brines, lithium-bearing ores are alternative resources for lithium chemicals, widely available in most areas. However, the current leaching method from ores is energy-intensive and large acid consuming, leading to high extraction price and limiting its wide application. Therefore, the main barrier to lithium supply is to develop an economical, sustainable method to extract lithium from widely available resources.

Among all the lithium-bearing ores, spodumene ($LiAlSi_2O_6$) is the most promising candidate due to the highest lithium content (approximately 8 wt % $Li_2O$, 27.4 wt % $Al_2O_3$, 64.6 wt. % $SiO_2$). Spodumene can exist in α, β, and γ phases, where the α phase is the natural state. γ phase is a metastable phase when heating a phase between 700° C. to 900° C. The current extraction technology cannot directly leach lithium from the α phase spodumene, phase transformation from a to the β phase is needed. By heating the α phase above 1100° C., the β phase spodumene can be obtained with less density, i.e., less atom density per volume. By using ultra-high concentrated sulfuric acid (98 wt. %) and the roasting temperature of 250° C., lithium ions can only be leached out of β phase spodumene. However, the complete transformation from α to β phase typically needs to be held at 1100° C. for more than 10 hours, which is extremely energy-intensive. Therefore, there is a need to develop an energy-efficient and environment-friendly method to extract lithium from α phase spodumene or other phases of natural ores directly. These needs are at least partially satisfied by the present disclosure.

Besides the traditional acid leaching method, electrochemical leaching is widely applied to recover critical elements (e.g., rare-earth elements) from e-wastes and used batteries. Electrochemical leaching, where the critical elements are dissolved into the electrolyte through the reaction of an electrolytic cell, has the advantages of selectivity, higher energy efficiency, and leaching efficiency. Electrochemical leaching can be operated at room temperature and decreases the usage of sulfuric acid (typically 0.1-1 M) as driven by electric current. It also has high selectivity towards certain elements, e.g., the deintercalation of lithium ions from the layered structure cathode, leading to much higher energy efficiency. Moreover, electrochemical leaching can reach a leaching efficiency of over 90%, much more efficient than traditional leaching technologies. However, typical electrochemical leaching is a heterogeneous process, requiring the good electric and ionic conductivity of feedstocks, while most ores barely conduct electrons and ions. Hence, it's a challenge to directly apply the existing electrochemical leaching method to extract lithium out of ores. Herein, a novel electrochemical leaching method that can directly leach lithium out of the α phase spodumene without phase transformation is introduced in the following section.

SUMMARY OF THE INVENTION

In one aspect disclosed herein is a method to leach lithium via the electrochemical apparatus that comprises: a) a current collector with solid-state/suspended lithium-bearing materials; (b) carbon-based or metal/alloy-based electrodes; c) an electrolyte. The oxidation voltage is applied to the current collector to electrochemically leach lithium ions into the liquid phase out of the insoluble lithium-bearing materials. In yet still further aspects, the lithium-bearing material comprises α-spodumene, β-spodumene, lepidolite, hectorite, jadarite, Li-enriched clay, used-Li batteries materials, Li-bearing waste stream from mining or processing of coal, coal by-product, coal mineral, oil shale, coal underclay, coal overburden, and/or recycled material.

In other aspects, the electrochemical leaching promoter is added to facilitate electrochemical leaching. The promoter can carry electrons and lower the reaction potential hence improving the energy efficiency. In yet still further aspects, the promoter comprises one or more compounds comprising $O_2$, $O_3$, $H_2O_2$, $HNO_3$, $F_2$, $Cl_2$, $Br_2$, $I_2$, $ClO^-$, $Fe^{2+}$, $Fe^{3+}$, $S_2O_8^{2-}$, $SO_5^{2-}$, $KMnO_4$, $N_2O$, $NO_2$, and/or $SO_2$.

In other aspects, a multi-functional current collector for scale-up leaching is introduced, composed of a) a carbon or metal framework; b) foam with a large surface area; c) catalysts nanoparticles loading. This multi-functional current collector has a large surface, low electrochemical overpotential, and capability for hydrogen peroxide production.

An exemplary embodiment can relate to a method for leaching lithium via an electrochemical apparatus including a carbon-based or metal/alloy-based current collector, and an electrolyte with a lithium-bearing material dispersed or suspended therein or lithium-bearing material coated onto the current collector. The method can involve applying voltage to the current collector to leach lithium from the lithium-bearing material.

In some embodiments, applying the voltage can increase the amount and/or rate of lithium extraction within the electrochemical apparatus.

In some embodiments, the electrode can include graphite, carbon paper, carbon cloth, carbon felt, carbon fiber, metal, and/or metal alloy materials, e.g. aluminum, stainless steel platinum, gold, titanium, 2D materials e.g. BN, $MoS_2$, $WS_2$, MXenes, or any combination thereof.

In some embodiments, the lithium-bearing material can be a solid-state lithium-bearing material coated onto the current collector or dispersed or suspended in the electrolyte.

In some embodiments, the lithium-bearing material can include α-spodumene, β-spodumene, lepidolite, hectorite, jadarite, Li-enriched clay, Li battery material, Li-bearing waste stream from mining or processing of coal, coal by-product, coal mineral, oil shale, coal underclay, coal overburden, and/or recycled material.

In some embodiments, the lithium-bearing material can include aluminum, calcium, iron, silicon, sodium, and/or rare earth element.

In some embodiments, lithium content of lithium-bearing material can be within a range from greater than 0 wt. % to 100 wt. %; and/or the electrolyte can have a pH ranging from 0-14.

In some embodiments, the electrolyte can be any one or combination of $H_2SO_4$, HCl, $H_3PO_4$, $H_3BO_3$, HClO, $H_2S_2O_8$, $H_2S_2O_8$, $KMnO_4$, $HNO_3$, $H_2O_2$, NaOH, $Na_2CO_3$, $NaHCO_3$, NaCl, KCl, NaClO, KClO, $Na_2HPO_4$, or $KH_2PO_4$ in a water solvent or and organic solvent, e.g., $LiPF_6$ in ethylene carbonate and diethyl carbonate, LiTFSI in 1,3-dioxolane and 1,2-dimethoxyethane, etc.

In some embodiments, the electrode can include a lithium-bearing material mixed with a conductive carbon material and a polymer binder or suspended lithium-bearing materials or any combination thereof.

In some embodiments, the lithium-bearing material of the electrode can include α-spodumene, β-spodumene, lepidolite, hectorite, jadarite, Li-enriched clay, Li battery material, Li-bearing waste stream from mining or processing of coal, coal by-product, coal mineral, oil shale, coal underclay, coal overburden, and/or recycled material.

In some embodiments, the polymer binder can include Nafion, polyvinylidene fluoride, styrene-butadiene rubber/sodium carboxyl methylcellulose, polytetrafluoroethylene, polyacrylic acid, sodium alginate, and/or polysaccharide.

In some embodiments, conductive carbon material of the electrode can include carbon black, natural graphite, artificial graphite, graphene, graphene oxide, and/or reduced graphene oxide.

In some embodiments, electrochemical leaching method for the electrochemical apparatus can be applying a constant voltage, a constant current, and/or a sweeping voltage.

In some embodiments, the method can involve ex-situ adding an oxidant promoter to the electrolyte to increase the amount or rate of electron conduction and/or to lower reaction potential of the electrochemical apparatus.

In some embodiments, ex-situ adding the oxidant promoter can improve energy efficiency of the electrochemical apparatus.

In some embodiments, the oxidant promoter can include $O_2$, $O_3$, $H_2O_2$, $HNO_3$, $F_2$, $Cl_2$, $Br_2$, $I_2$, $ClO^-$, $Fe^{2+}$, $Fe^{3+}$, $S_2O_8^{2-}$, $SO_5^{2-}$, $KMnO_4$, $N_2O$, $NO_2$, and/or $SO_2$.

In some embodiments, the method can involve in-situ forming of an oxidant promoter with assistance from a catalyst and an oxygen gas to increase the amount or rate of electron conduction and/or to lower the reaction potential of the electrochemical apparatus.

In some embodiments, in-situ forming of the oxidant promoter can improve energy efficiency of the electrochemical apparatus.

In some embodiments, the oxidant promoter can include $O_2$, $O_3$, $H_2O_2$, $HNO_3$, $F_2$, $Cl_2$, $Br_2$, $I_2$, $ClO^-$, $Fe^{2+}$, $Fe^{3+}$, $S_2O_8^{2-}$, $SO_5^{2-}$, $KMnO_4$, $N_2O$, $NO_2$, and/or $SO_2$.

An exemplary embodiment can relate to a multi-functional current collector. The collector can include a carbon-based or metal-based framework; graphene oxide aerogel foam; and a catalyst.

In some embodiments, the carbon-based or metal-based framework can include graphite, carbon paper, carbon cloth, carbon felt, carbon fiber, metal, and/or metal alloy, e.g. aluminum, stainless steel platinum, gold, titanium, 2D materials (e.g. BN, $MoS_2$, $WS_2$, MXenes, etc.), etc.

In some embodiments, the graphene oxide aerogel foam can include graphene oxide, graphene, boron nitride, transition metal dichalcogenides, and/or a two-dimensional material.

In some embodiments, the current collector can include a polymer binder.

In some embodiments, the polymer binder can include Nafion, polyvinylidene fluoride, styrene-butadiene rubber/sodium carboxyl methylcellulose, polytetrafluoroethylene, polyacrylic acid, sodium alginate, and/or polysaccharide.

In some embodiments, the current collector can include: a polymer binder including Nafion, polyvinylidene fluoride, styrene-butadiene rubber/sodium carboxyl methylcellulose, polytetrafluoroethylene, polyacrylic acid, sodium alginate, and/or polysaccharide; wherein the graphene oxide aerogel foam can include graphene oxide, graphene, boron nitride, transition metal dichalcogenides, and/or a two-dimensional material; wherein: the weight ratio of the graphene oxide or the two-dimensional material to polymer binder ranges from 100:1 to 10:1; and/or the weight ratio of the graphene oxide or the two-dimensional material to carbon-based framework ranges from 1:100 to 1:20.

In some embodiments, the catalyst can include Au, Ag, Pt, Pd, $MoS_2$, $WS_2$, and/or BN. In some embodiments, the catalyst can include a metallic nanoparticle.

In some embodiments, the multi-functional current collector is operable within an environment including an electrolyte having a lithium-bearing material dispersed or suspended therein.

In some embodiments, the lithium-bearing material can include α-spodumene, β-spodumene, lepidolite, hectorite, jadarite, Li-enriched clays, Li battery material, waste stream from mining or processing of coal, coal by-product, coal mineral, oil shale, coal underclay, coal overburden, and/or recycled material.

In some embodiments, the multi-functional current collector can be fabricated by a freeze-drying technique and/or a hydrothermal technique.

In some embodiments, the multi-functional current collector can be a component of an electrochemical apparatus that is operable with electrochemical test including application of constant voltage, constant current, pulsed current and/or sweeping voltage.

An exemplary embodiment relates to a method for leaching lithium via an electrochemical apparatus including: a multi-functional current collector; an electrode; an electrolyte; and a lithium-bearing material, wherein the lithium-bearing material is dispersed or suspended in the electrolyte or the lithium-bearing material is coated onto the current collector, wherein the method involves applying voltage to the current collector to leach lithium from the lithium-bearing material.

In some embodiments, the current collector is a working electrode for the electrochemical apparatus; and the electrode is a counter electrode for the electrochemical apparatus.

In some embodiments, the method involves applying the voltage increases the amount and/or rate of lithium extraction within the electrochemical apparatus.

In some embodiments, the working electrode includes graphite, carbon paper, carbon cloth, carbon felt, carbon fiber, metal, and/or metal alloy materials; and the counter electrode includes graphite, carbon paper, carbon cloth, carbon felt, carbon fiber, metal, and/or metal alloy.

In some embodiments, the current collector includes aluminum, stainless steel platinum, gold, titanium, a 2D material, BN, $MoS_2$, $WS_2$, and/or MXenes; and the electrode includes aluminum, stainless steel platinum, gold, titanium, a 2D material, BN, $MoS_2$, $WS_2$, and/or MXenes.

In some embodiments, the electrolyte is a liquid electrolyte; and the lithium-bearing material is a solid-state lithium-bearing material dispersed or suspended in the liquid electrode or the solid-state lithium-bearing material is coated onto the current collector.

In some embodiments, the lithium-bearing material includes α-spodumene, β-spodumene, lepidolite, hectorite, jadarite, Li-enriched clay, Li battery material, Li-bearing waste stream from mining or processing of coal, coal by-product, coal mineral, oil shale, coal underclay, coal overburden, and/or recycled material.

In some embodiments, the lithium-bearing material includes one or more of aluminum, calcium, iron, silicon, sodium, or rare earth element.

In some embodiments, lithium content of the lithium-bearing material is within a range from greater than 0 wt. % to 100 wt. %.

In some embodiments, the electrolyte is any one or combination of $H_2SO_4$, HCl, $H_3PO_4$, $H_3BO_3$, HClO, $H_2S_2O_8$, $H_2S_2O_8$, $KMnO_4$, $HNO_3$, $H_2O_2$, NaOH, $Na_2CO_3$, $NaHCO_3$, NaCl, KCl, NaClO, KClO, $Na_2HPO_4$, or $KH_2PO_4$ in a water solvent or an organic solvent e.g., $LiPF_6$ in ethylene carbonate and diethyl carbonate, LiTFSI in 1,3-dioxolane and 1,2-dimethoxyethane.

In some embodiments, the organic solvent includes $LiPF_6$ in ethylene carbonate and diethyl carbonate or LiTFSI in 1,3-dioxolane and 1,2-dimethoxyethane.

In some embodiments, the current collector includes a lithium-bearing material mixed with a conductive carbon material and a polymer binder.

In some embodiments, the lithium-bearing material coated onto the current collector includes α-spodumene, β-spodumene, lepidolite, hectorite, jadarite, Li-enriched clay, Li battery material, Li-bearing waste stream from mining or processing of coal, coal by-product, coal mineral, oil shale, coal underclay, coal overburden, and/or recycled material.

In some embodiments, the polymer binder includes Nafion, polyvinylidene fluoride, styrene-butadiene rubber/sodium carboxyl methylcellulose, polytetrafluoroethylene, polyacrylic acid, sodium alginate, and/or polysaccharide.

In some embodiments, conductive carbon material of the current collector includes carbon black, natural graphite, artificial graphite, graphene, graphene oxide, and/or reduced graphene oxide.

In some embodiments, applying voltage involves applying a constant voltage, a constant current, pulsed current, and/or a sweeping voltage.

In some embodiments, the method involves ex-situ adding an oxidant promoter to the electrolyte to increase the amount or rate of electron conduction and/or to lower the reaction potential of the electrochemical apparatus.

In some embodiments, ex-situ adding the oxidant promoter improves energy efficiency of the electrochemical apparatus.

In some embodiments, the oxidant promoter includes $O_2$, $O_3$, $H_2O_2$, $HNO_3$, $F_2$, $Cl_2$, $Br_2$, $I_2$, $ClO^-$, $Fe^{2+}$, $Fe^{3+}$, $S_2O_8^{2-}$, $SO_5^{2-}$, $KMnO_4$, $N_2O$, $NO_2$, and/or $SO_2$.

In some embodiments, the method involves in-situ forming of an oxidant promoter with assistance from a catalyst and an oxygen gas to increase the amount or rate of electron conduction and/or to lower the reaction potential of the electrochemical apparatus.

In some embodiments, in-situ forming of the oxidant promoter improves energy efficiency of the electrochemical apparatus.

In some embodiments, the oxidant promoter includes $O_2$, $O_3$, $H_2O_2$, $HNO_3$, $F_2$, $Cl_2$, $Br_2$, $I_2$, $ClO^-$, $Fe^{2+}$, $Fe^{3+}$, $S_2O_8^{2-}$, $SO_5^{2-}$, $KMnO_4$, $N_2O$, $NO_2$, and/or $SO_2$.

An exemplary embodiment relates to a multi-functional current collector. The collector includes: a carbon-based or metal-based framework; graphene oxide aerogel foam; and a catalyst.

In some embodiments, the carbon-based framework or the metal-based framework includes carbon felt, carbon foam, carbon fiber, platinum foil/foam, gold foil/foam, nickel foil/foam, copper foil/foam, stainless steel foil/foam, and/or a carbon-based porous structure.

In some embodiments, the graphene oxide aerogel foam includes graphene oxide, graphene, boron nitride, transition metal dichalcogenides, and/or a two-dimensional material.

In some embodiments, the collector includes a polymer binder.

In some embodiments, the polymer binder includes Nafion, polyvinylidene fluoride, styrene-butadiene rubber/sodium carboxyl methylcellulose, polytetrafluoroethylene, polyacrylic acid, sodium alginate, and/or polysaccharide.

In some embodiments, the collector includes: a polymer binder including Nafion, polyvinylidene fluoride, styrene-butadiene rubber/sodium carboxyl methylcellulose, polytetrafluoroethylene, polyacrylic acid, sodium alginate, and/or polysaccharide; wherein the graphene oxide aerogel foam includes graphene oxide, graphene, boron nitride, transition metal dichalcogenides, and/or a two-dimensional material; wherein: the weight ratio of the graphene oxide or the two-dimensional material to polymer binder ranges from 100:1 to 10:1; and/or the weight ratio of the graphene oxide or the two-dimensional material to carbon-based framework ranges from 1:100 to 1:20.

In some embodiments, the catalyst includes Au, Ag, Pt, and/or Pd.

In some embodiments, the catalyst includes a metallic nanoparticle.

In some embodiments, the multi-functional current collector is operable within an environment including an electrolyte having a lithium-bearing material dispersed or suspended therein.

In some embodiments, the lithium-bearing material includes α-spodumene, β-spodumene, lepidolite, hectorite, jadarite, Li-enriched clay, Li battery material, Li-bearing waste stream from mining or processing of coal, coal by-product, coal minerals, oil shale, coal underclay, coal overburden, and/or recycled material.

In some embodiments, the multi-functional current collector is fabricated by a freeze-drying technique and/or a hydrothermal technique.

In some embodiments, the multi-functional current collector is a component of an electrochemical apparatus that is operable with electrochemical test including application of constant voltage, constant current, pulsed current, and/or sweeping voltage.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

FIG. 1 shows an exemplary electrochemical apparatus that can be used to leach lithium from lithium-bearing materials.

FIG. 2 shows an exemplary process flow for leach lithium from lithium-bearing materials.

DETAILED DESCRIPTION OF THE INVENTION

Figure 3:
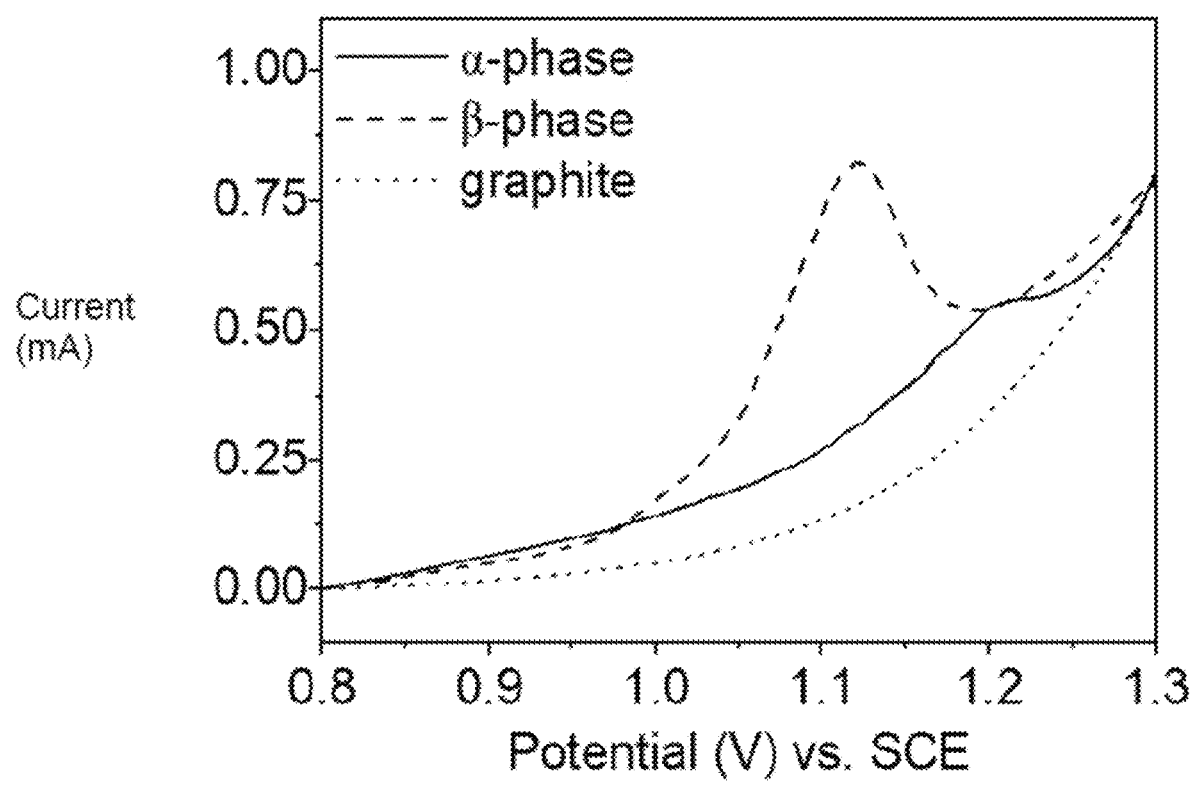
FIG. 3 depicts the cyclic voltammetry without promoters using different lithium-bearing materials, confirming the electrochemical leaching of lithium from lithium-bearing materials.

The following description is of exemplary embodiments that are presently contemplated for carrying out the present invention. This description is not to be taken in a limiting sense, but is made merely for the purpose of describing the general principles and features of various aspects of the present invention. The scope of the present invention is not limited by this description.

Referring to FIG. 1 (image A is a side view, image B is a top-down view, and image C is a schematic) and FIG. 2, embodiments of the electrochemical apparatus 100 can include a working electrode 102, a counter electrode 104, a reference electrode 106, and lithium bearing materials 108. The working electrode 102 can be a carbon-based or metal-based electrode. The working electrode 102 can include graphite, carbon paper, carbon cloth, carbon felt, carbon fiber, metal and metal alloy materials, e.g. aluminum, stainless steel platinum, gold, titanium, 2D materials e.g. BN, $MoS_2$, $WS_2$, MXenes, or any combination thereof. The counter electrode 104 can be a carbon-based or metal-based electrode. Materials for the carbon-based or metal-based counter electrode 104 can include graphite, carbon paper, carbon cloth, carbon felt, carbon fiber, metal and metal alloy materials, e.g. aluminum, stainless steel platinum, gold, titanium, 2D materials e.g. BN, $MoS_2$, $WS_2$, MXenes, or any combination thereof. The reference electrode 106 can be a saturated calomel electrode (SCE). The lithium bearing materials 108 can be a mixture of polymer binder and conductive carbon materials. Conductive carbon material of the carbon-based current collector 108 and/or the carbon-based counter electrode 104 can include carbon black, natural graphite, artificial graphite, graphene, graphene oxide, reduced graphene oxide, or any combination thereof.

While the exemplary embodiments described and illustrated herein relate to an apparatus 100 having a working electrode 102, a counter electrode 104, and a reference electrode 106, it is understood that the apparatus 100 can have other configurations. For instance, the apparatus 100 can include a multi-functional current collector, an electrode, an electrolyte, and a lithium-bearing material. The lithium-bearing material can be dispersed or suspended in the electrolyte. In addition, or in the alternative, the lithium-bearing material can be coated onto the current collector. The current collector may be operable as a working electrode 102. The electrode may be operable as a counter electrode 104. The electrochemical apparatus 100 operates via use of electrolyte 110. The electrolyte 110 can be any one or combination of $H_2SO_4$, HCl, $H_3PO_4$, $H_3BO_3$, HClO, $H_2S_2O_8$, $H_2S_2O_8$, $KMnO_4$, $HNO_3$, $H_2O_2$, NaOH, $Na_2CO_3$, $NaHCO_3$, NaCl, KCl, NaClO, KClO, $Na_2HPO_4$, $KH_2PO_4$ in water or organic solvents e.g., $LiPF_6$ in ethylene carbonate and diethyl carbonate, LiTFSI in 1,3-dioxolane and 1,2-dimethoxyethane, etc. The electrolyte 110 can have lithium-bearing material dispersed therein, or lithium-bearing material can be dispersed within the electrolyte 110—e.g., the method can be used to extract lithium form the lithium-bearing material, wherein the lithium-bearing material is used as a component of the electrolyte 110. The lithium-bearing material can be a solid-state lithium-bearing material. The lithium-bearing material can include α-spodumene, β-spodumene, lepidolite, hectorite, jadarite, Li-enriched clays, Li batteries, waste stream from mining or processing of coal, coal by-product, coal mineral, oil shale, coal underclay, coal overburden, recycled materials, or any combination thereof. The lithium-bearing material can include one or more of aluminum, calcium, iron, silicon, sodium, or rare earth element. The lithium content of lithium-bearing material can be within a range from greater than 0 wt. % to 100 wt. %. The electrolyte 110 can have a concentration that is equal to or less than 10 moles. With embodiments of the method disclosed herein, the usage of the acid can be down to 5%-50% compared to the traditional leaching technology.

The counter electrode 104 can include a lithium-bearing material mixed with a conductive carbon material and a polymer binder. The lithium-bearing material of the counter electrode 104 can include α-spodumene, β-spodumene, lepidolite, hectorite, jadarite, Li-enriched clay, Li battery material, waste stream from mining or processing of coal, coal by-product, coal mineral, oil shale, coal underclay, coal overburden, recycled material, or any combination thereof. The polymer binder can include Nafion, polyvinylidene fluoride, styrene-butadiene rubber/sodium carboxyl methylcellulose, polytetrafluoroethylene, polyacrylic acid, sodium alginate, polysaccharide or any combination thereof.

The method can involve applying voltage to the current collector 108 to leach lithium from the lithium-bearing material. Applying the voltage increases the amount and/or rate of lithium extraction within the electrochemical apparatus 100. Applying voltage can be achieved via application of a constant voltage, a constant current, pulsed current and/or a sweeping voltage. Test results demonstrate that cyclic voltammetry voltage scan for the electrochemical apparatus 100 can be less than 1.5 V, below the oxygen evolution reaction potential. Cyclic voltammetry scan speed can be within a range from 0.1 mV to 10 mV. Hence the leaching speed is faster than the traditional leaching technique.

Some embodiments can involve adding an oxidant promoter to the electrolyte 110. This can be done to increase the amount or rate of electron conduction and/or to lower reaction potential of the electrochemical apparatus 100. Adding the oxidant promoter can improve energy efficiency of the electrochemical apparatus 100. The oxidant promoter can include $O_2$, $O_3$, $H_2O_2$, $HNO_3$, $F_2$, $Cl_2$, $Br_2$, $I_2$, $ClO^-$, $Fe^{2+}$, $Fe^{3+}$, $S_2O_8^{2-}$, $SO_5^{2-}$, $KMnO_4$, $N_2O$, $NO_2$, $SO_2$, or a combination thereof. The application of promoters does not significantly increase the leaching cost. The oxidant promoter can be added before or during the operation of the electrochemical apparatus 100. The oxidant promoter can be added a single time, continuously, periodically, in batches, in a continuous batch process, or via some other scheme.

Figure 12:
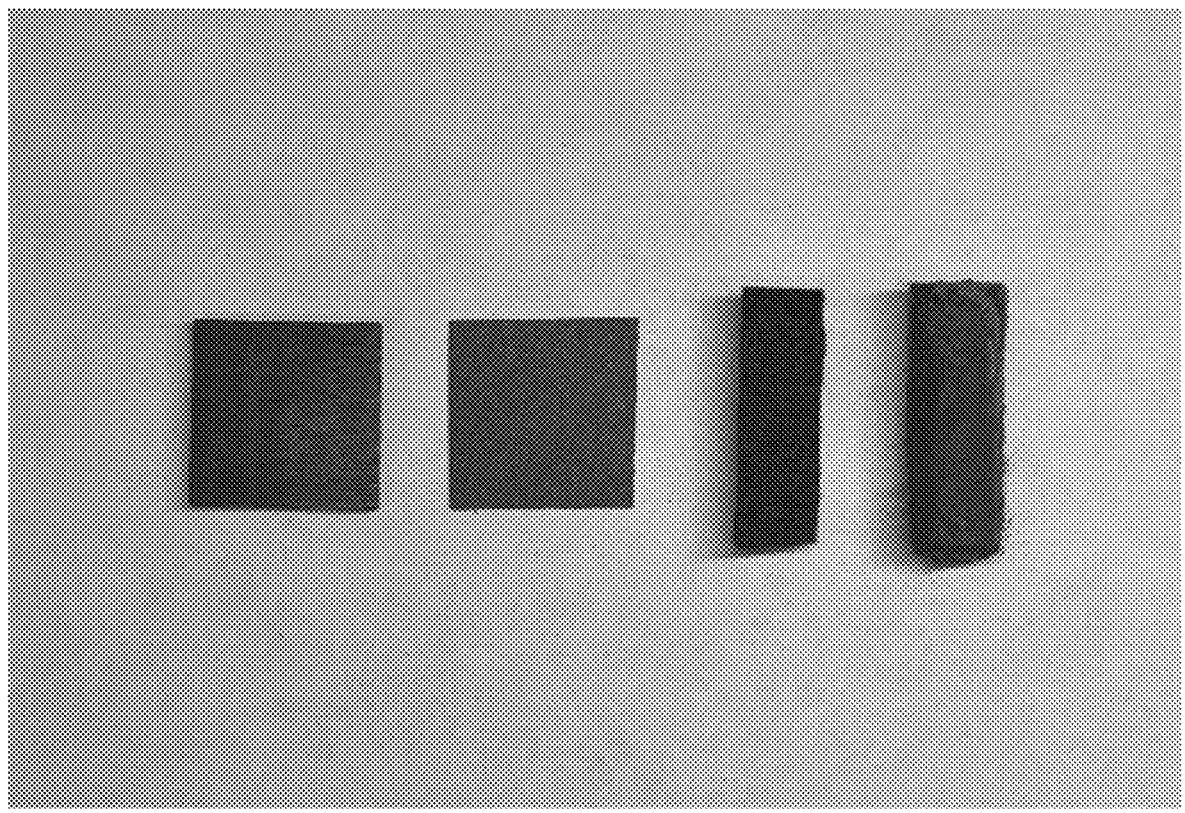
FIG. 12 depicts the different carbon-based materials for electrochemical leaching, including graphite, carbon paper, carbon felt, and an as-designed multi-functional current collector.
Figure 13:
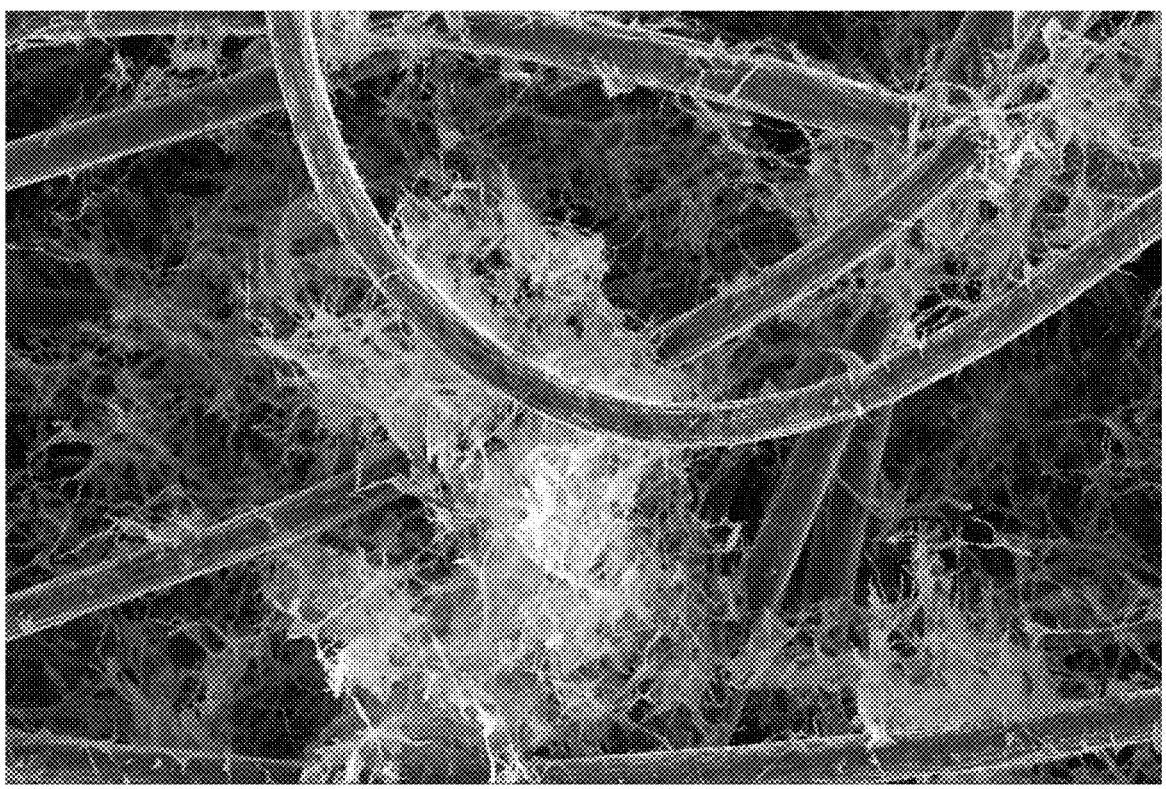
FIG. 13 depicts the SEM image of the multi-functional current collector, confirming the as-designed current collector has an enlarged surface area and hydrogen conducting polymer coating.
Figure 20:
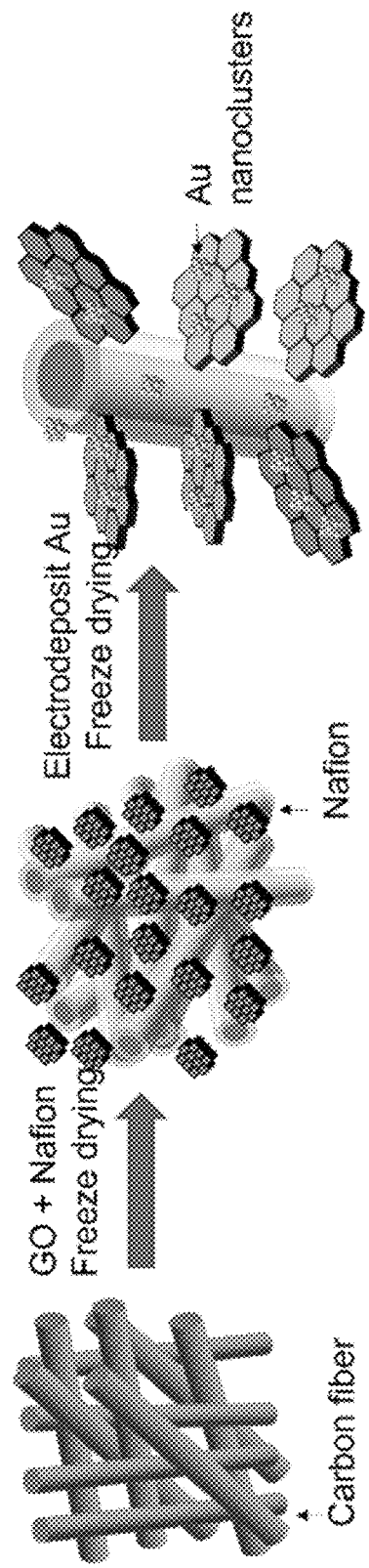
FIG. 20 depicts a schematic of the fabrication of multi-functional current collectors.

Referring to FIGS. 12, 13, and 20, embodiments can also relate to a multi-functional current collector 108. For instance, the current collector 108 can be configured as a multi-functional current collector. In an exemplary embodiment, the multi-functional current collector 108 can include a porous material such as a carbon felt framework; however, it is understood that the multi-functional current collector 108 can be composed of any carbon-based or metal-based framework. The functional current collector 108 can also include a graphene oxide foam (e.g., aerogel foam) and metallic (e.g., Au catalyst) catalyst. In the exemplary embodiment, the graphene oxide solution, Nafion solution and carbon felt are placed in a plastic container, followed by freeze-drying. After the freeze drying, a GO-modified carbon felt can be obtained. Then the GO-modified carbon felt is placed in $HAuCl_4$ electrolyte and electrochemically deposit Au nanoparticle catalysts. After the electrochemical deposition, the current collector is freeze-drying again to maintain the surface area. The carbon felt framework can include carbon felt, carbon foam, carbon fiber, nickel foam, copper foam, stainless steel foam, a carbon-based porous structure, or any combination thereof. The graphene oxide aerogel foam can include graphene oxide, graphene, boron nitride, transition metal dichalcogenides, a two-dimensional material with a large surface area (e.g., 200 $m^2\ g^{-1}$), or any combination thereof. Some embodiments include a polymer binder. The metallic catalyst can include Au, Ag, Pt, Pd, or any combination thereof. The metallic catalyst can include a metallic nanoparticle. The polymer binder can include Nafion, polyvinylidene fluoride, styrene-butadiene rubber/sodium carboxyl methylcellulose, polytetrafluoroethylene, polyacrylic acid, sodium alginate, polysaccharide, or any combination thereof. The weight ratio of the graphene oxide or the two-dimensional material to polymer binder can range from 100:1 to 10:1. The weight ratio of the graphene oxide or the two-dimensional material to carbon felt framework can range from 1:100 to 1:20.

The multi-functional current collector 108 can be operated within an environment including electrolyte 110 having a lithium-bearing material dispersed therein. The lithium-bearing material can include α-spodumene, β-spodumene, lepidolite, hectorite, jadarite, Li-enriched clay, Li battery material, waste stream from mining or processing of coal, coal by-product, coal mineral, oil shale, coal underclay, coal overburden, recycled material, or any combination thereof.

It is contemplated for the multi-functional current collector 108 to be fabricated by freeze-drying, hydrothermal, or a combination of two. It is further contemplated for the multi-functional current collector to be used as a component of an electrochemical apparatus 100 that is operable with electrochemical test including application of constant voltage, constant current, pulsed current, and/or sweeping voltage.

Examples and Test Results

It becomes crucial to unlock the unconventional lithium sources and develop eco-friendly methods to extract lithium. As listed in TABLE. 1, among all the lithium-bearing ores, spodumene has the highest lithium content. Traditional leaching technology requires calcination of natural spodumene or α phase spodumene (monoclinic crystal structure) into the thermodynamically favorable β phase spodumene (tetragonal crystal structure). As reported previously, the calcination process is under 1100° C. for 12 h. After the calcination, the spodumene is mixed with carbon black and Nafion binder with a weight ratio of 6:3:1. The as-prepared mixture is dispersed in water and coated onto a carbon-based host via doctor blading, then dried under 60° C. for 12 hours in a vacuum oven. The prepared electrode is used as the working electrode, and the electrochemical apparatus is shown in FIG. 1.

TABLE 1

Summary of lithium-bearing ores

| Ore name | Chemical formula | Lithium content (wt. %) |
|---|---|---|
| Spodumene | $LiAlSi_2O_6$ | 3.7 |
| Lepidolite | $K(Li, Al)_3(Al, Si, Rb)_4O_{10}(F, OH)_2$ | 1.39-3.6 |
| Petalite | $LiAlSi_4O_{10}$ | 1.6-2.27 |
| Eucryptite | $LiAlSiO_4$ | 2.1 |
| Amblygonite | $LiAl(PO_4)(F, OH)$ | 3.4 |
| Hectorite | $Na_{0.3}(Mg, Li)_3Si_4O_{10}(OH)_2$ | 0.54 |

Figure 4:
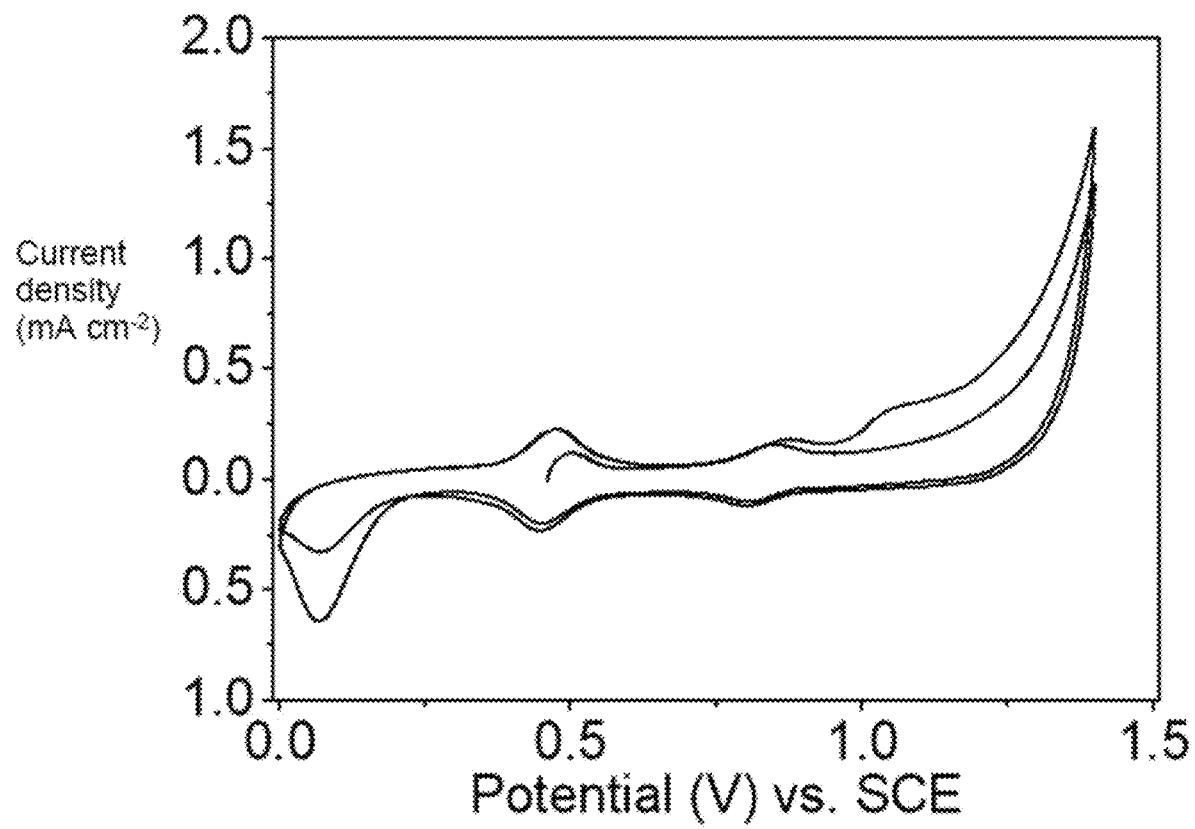
FIG. 4 depicts the cyclic voltammetry with hydrogen peroxide as promoters using β phase spodumene, confirming the electrochemical leaching of lithium from lithium-bearing materials is irreversible.

FIG. 3 shows the cyclic voltammetry of α phase and β phase spodumene, and the β phase has an electrochemical reaction at 1.1 V vs. SCE, while the oxidation peak of the α phase is at 1.2 V vs. SCE. It should be noted that the currents are normalized by the area, and the loading is 5 mg cm$^{-2}$, less than 5 wt. % deviations. The blank graphite has no side reactions (except for the oxygen evolution). The oxidation peak came from the leaching of $Li^+$ from the solid spodumene into the liquid phase and disappeared in the following cyclic voltammetry scans (see FIG. 4). This reaction is an ion-exchange between $Li^+$ and $H^+$, similar to the traditional lithium extraction mechanism.

Figure 5:
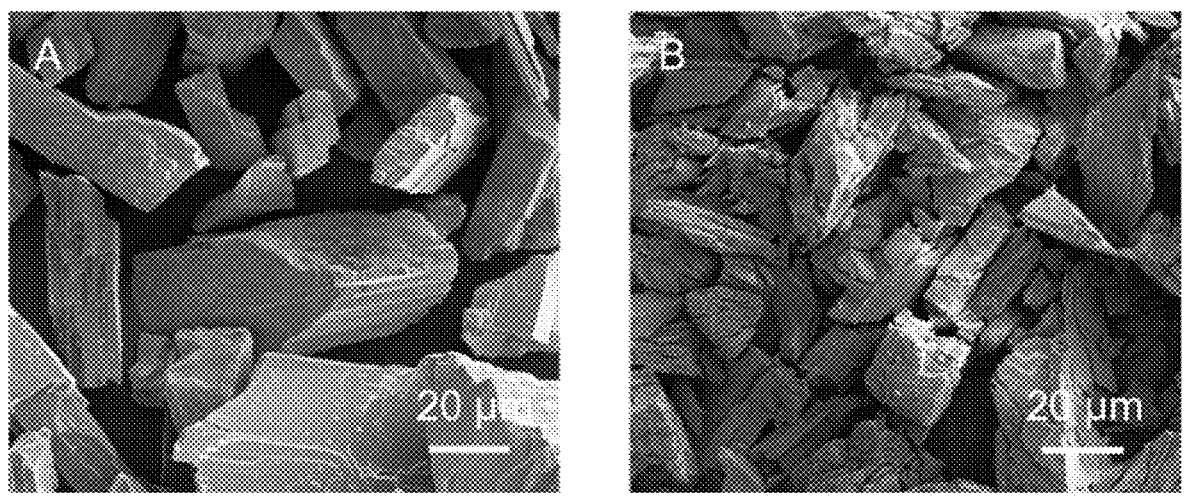
FIG. 5 shows scanning electron microscope (SEM) images of the α (image A) phase and β (image β) phase, confirming β phase has a larger surface area and loose structure.
Figure 6:
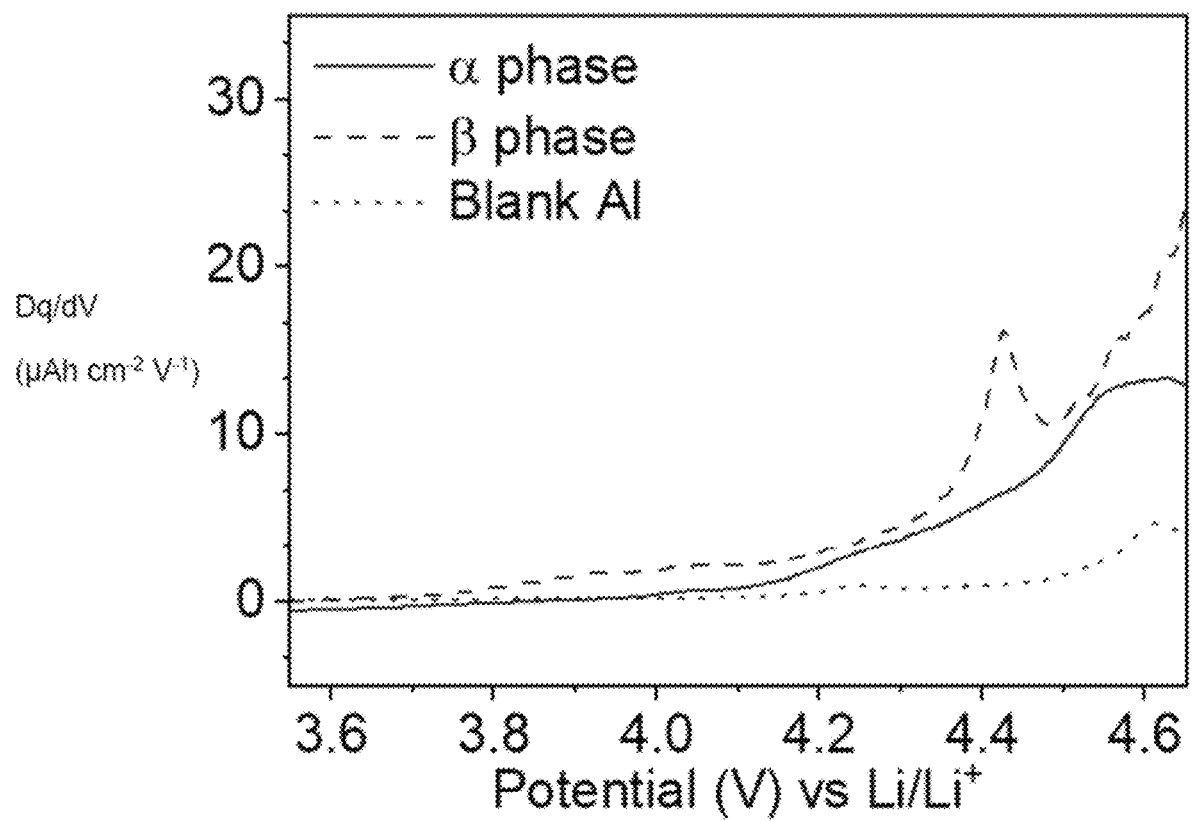
FIG. 6 depicts the cyclic voltammetry in the organic electrolyte (1M $LiPF_6$ in EC/December 1/1 v/v) using different lithium-bearing materials, confirming the electrochemical leaching of lithium from lithium-bearing materials.

After calcination, there is a noticeable morphology change, as shown in FIG. 5. α phase spodumene particles (image A of FIG. 5) have a compact morphology and a more significant density. In comparison, β phase particles (image B of FIG. 5) have an open structure and smaller particle size (20 μms of α phase vs. 10 μms of β phase). Because the leaching current density of the β phase is higher under the same electrode loading, the leaching efficiency of the β phase is much higher than the α phase. This ion-exchange reaction is also demonstrated in an organic electrolyte system (see FIG. 6). The different leaching efficiency is from the kinetic difference resulting from the crystal structure, similar to when using the traditional acid leaching.

The traditional technology triggers this lithium dissolution reaction balance by ultra-high concentration acid and heating input. Herein, the driving force is applied potential. Compared to heating, electricity can be generated by renewable energy and is more efficient (due to the selectivity). However, the electrochemical leaching out of the α phase is tricky due to high overpotential and low current density, meaning energy-intensive phase transformation from α to β is still needed. A method that can directly leach lithium from the α phase will significantly lower the energy consumption.

Inspired by the wide applications in flow batteries, redox promoters are considered to facilitate the leaching of lithium from ores. Redox promoters are dissolvable chemicals that can transfer the redox states to the reagents. An electrochemical reaction is a heterogeneous reaction only at the solid/liquid interface. The redox promoters are electrochemically oxidized/reduced at the surface of conductive electrodes, subsequently diffuse to and chemically oxidize/reduce the specimens dispersed in the electrolyte. With the promoter, the whole process becomes a combination of heterogeneous and homogeneous reactions, which happens at both the solid/liquid interface and the bulk regions of the specimens. Promoters can also transfer the electrons to the active materials dispersed in the electrolyte through chemical reactions. Hence, the promoters can lower the reaction overpotential and assist the electron transfer, making it possible to use slurry electrodes even though the ores are poor electric conductors.

Figure 7:
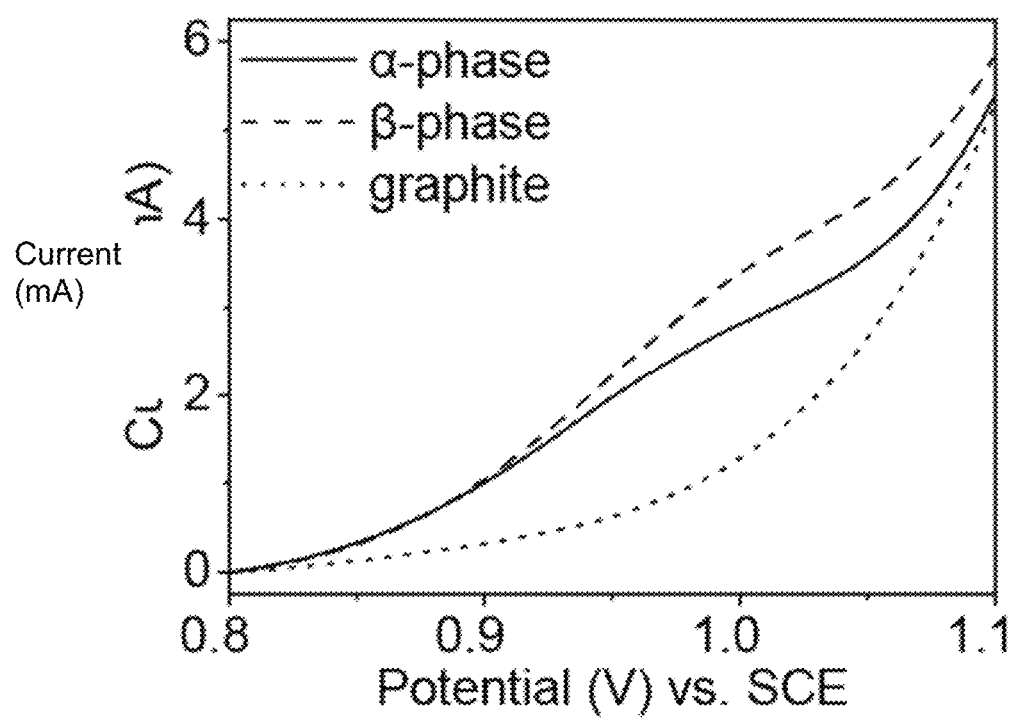
FIG. 7 depicts the cyclic voltammetry with hydrogen peroxide as promoters using different lithium-bearing materials, confirming the electrochemical leaching of lithium from lithium-bearing materials.

Among all the oxidant promoters, $H_2O_2$ was selected because its decomposed products ($H_2$ and $O_2$) have no ions and the decomposition potential (0.695 V) is very close to the lithium extraction from spodumene. FIG. 7 shows that with the addition of $H_2O_2$, the extraction potential shifts to 0.95 V vs. SCE, and the potential and the current density of electrochemical leaching out of α phase and β phase are very close. It confirms that the charge-transfer kinetics of the $O_2^{2-}/O_2$ couple is faster than the charge-transfer kinetics of the lithium extraction. Thus, the promoter can facilitate electrochemical leaching from spodumene. Besides, it also demonstrates that with the presence of $H_2O_2$, Li ions can be directly leached out of the α phase.

Figure 8:
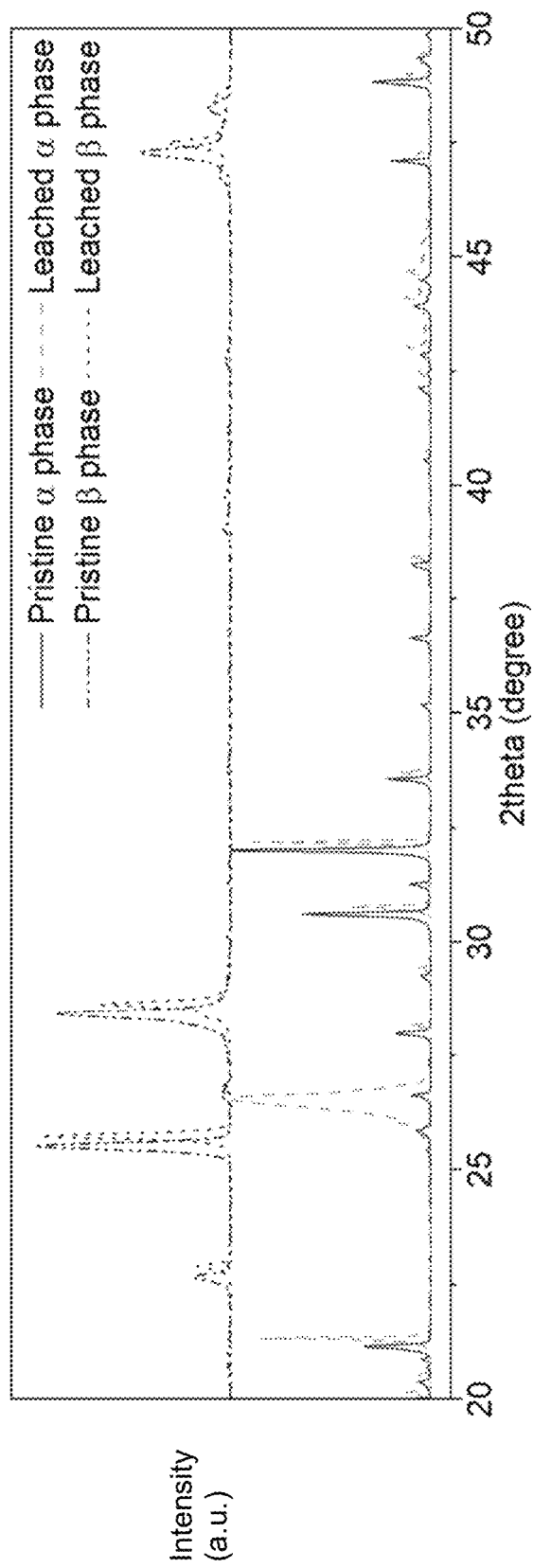
FIG. 8 depicts the X-ray powder diffraction (XRD) pattern of the lithium-bearing materials before and after the electrochemical leaching, confirming the leaching of lithium from lithium-bearing materials.
Figure 9:
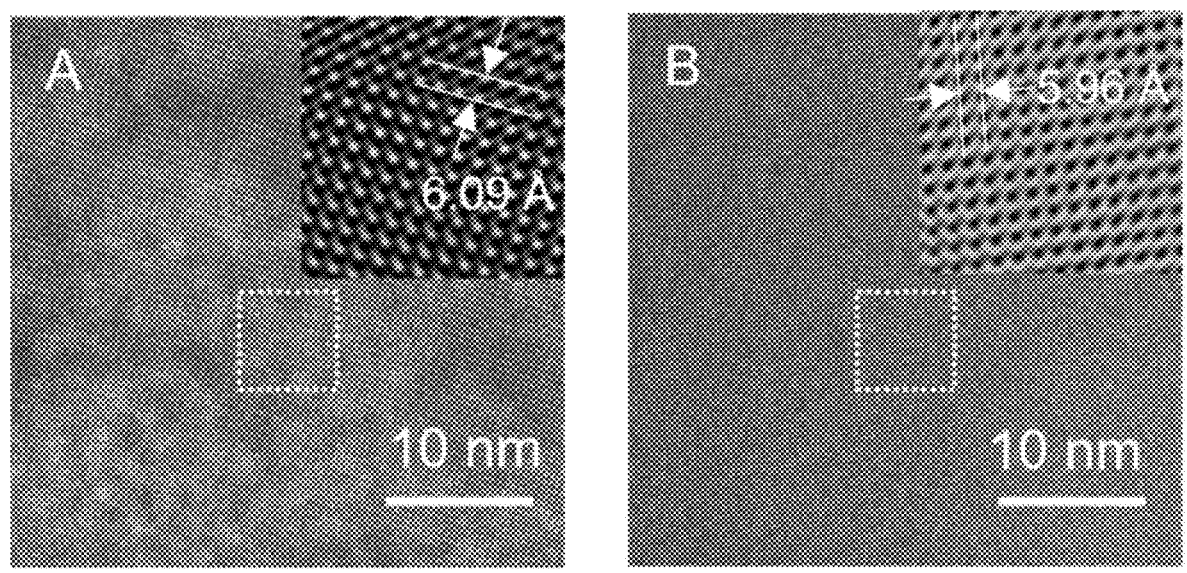
FIG. 9 depicts transmission electron microscopy (TEM) images of the lithium-bearing materials before (image A) and after (image B) the electrochemical leaching, confirming the leaching of lithium from lithium-bearing materials.

After electrochemical leaching, the residues' XRD patterns (FIG. 8) present a peak shift towards the right, indicating the lattice parameter shrinkage. The calculated lattice constant is shown in TABLE. 2. The shrinkage of lattice parameters validates the lithium dissolution causing the lattice shrinkage. A transmission electron microscope (TEM) was used to characterize the pristine and leached samples. As shown in FIG. 9, the lattice fringe confirms the shrinkage of the (110) plane (2%, from 6.09 Å to 5.96 Å) after the electrochemical leaching.

TABLE 2

Lattice constant of a phase before and after leaching.

| Sample name | Lattice constant a (Å) | Lattice constant b (Å) | Lattice constant c (Å) |
|---|---|---|---|
| Before leaching | 9.456 | 8.386 | 5.216 |
| After leaching | 9.388 | 8.331 | 5.199 |

However, the previous current densities were too small for practical lithium production. An electrode with a large surface area is needed for practical application to obtain a large current density. Two-dimensional materials flasks can form an aerogel structure with a high surface-to-volume ratio. Graphene oxide (GO) is chosen because it is hydrophilic, but the aerogel foam is too rigid and mechanically unstable. Porous materials can offer a flexible framework for aerogel, but metal foams (such as porous Ni foam) cannot be used because the leaching potential is higher than their oxidation potential. Hence, carbon felt (CF) is used as a carbon framework, and GO-modified carbon felt electrodes are prepared via freeze-drying. After the freeze-drying, GO formed a secondary structure inside the pores of carbon felt, significantly enlarging the surface area.

Figure 10:
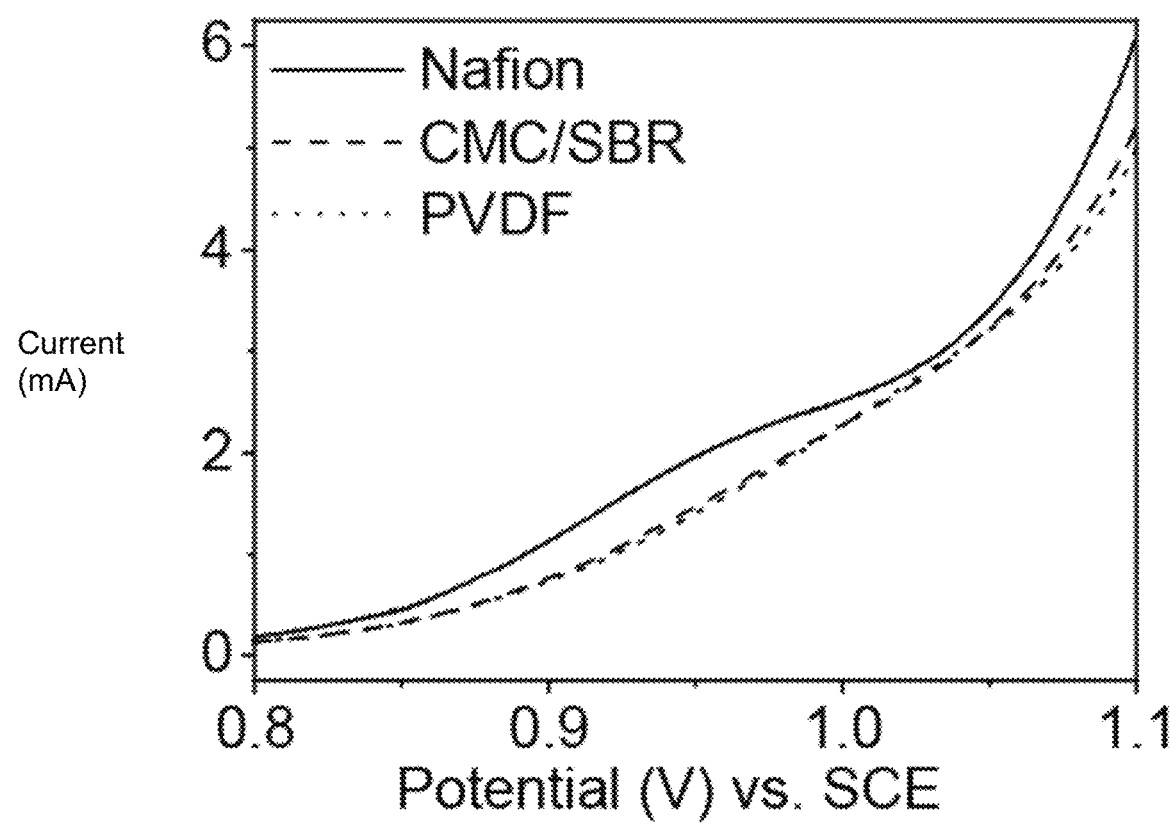
FIG. 10 depicts the cyclic voltammetry with hydrogen peroxide as promoters using different polymer binders, confirming the binders impact the electrochemical leaching of lithium from lithium-bearing materials.

The adhesion between the GO flasks and carbon felt is weak, and GO flasks are easily peeled off by vibration. The binders were added before the freeze-drying process. Three binders were tested here: Nafion, polyvinylidene fluoride (PVDF), and carboxymethyl cellulose (CMC)/styrene-butadiene rubber (SBR). As shown in FIG. 10, the Nafion binder shows the highest peak current density and lowest reaction overpotential, attributed to its proton-conducting properties. Best electrochemical performance makes Nafion an ideal binder for this multi-functional current collector.

Figure 11:
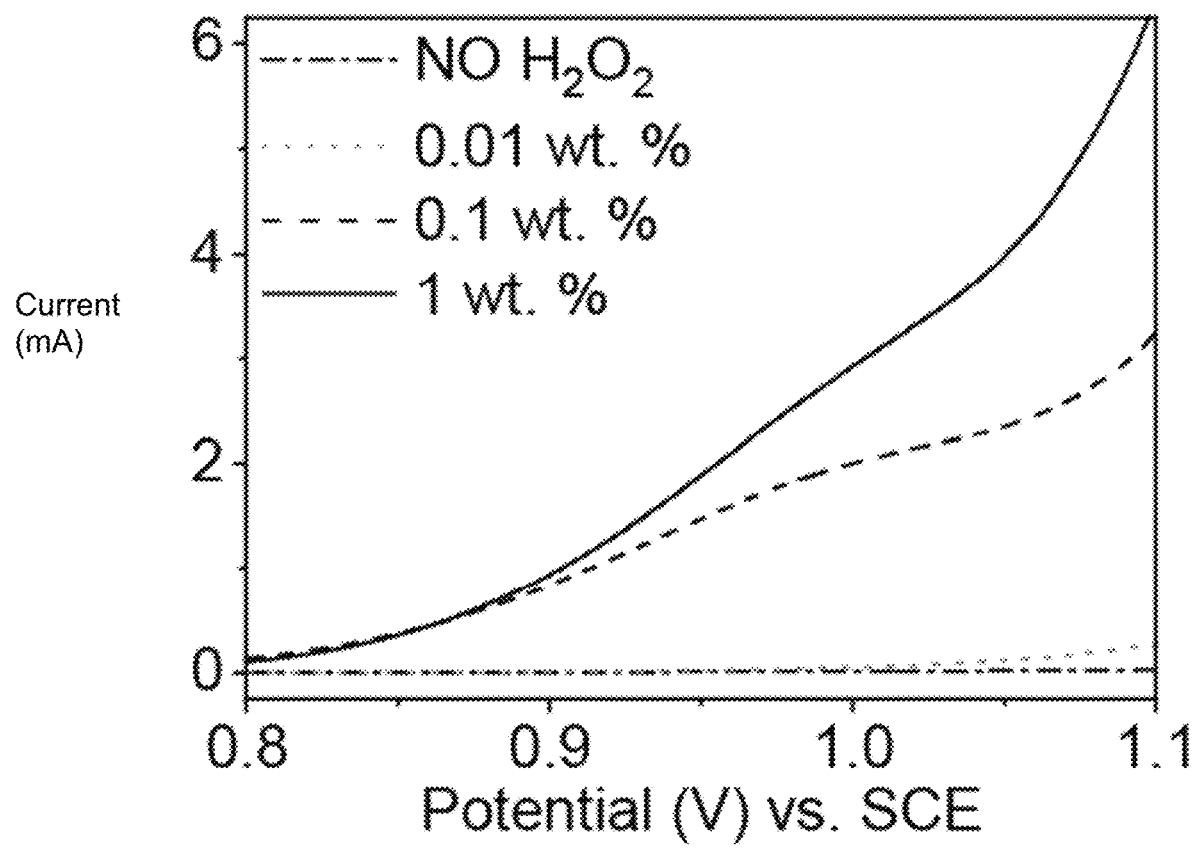
FIG. 11 depicts the cyclic voltammetry with different concentration of hydrogen peroxide as promoters, confirming the promoter concentration impact the electrochemical leaching of lithium from lithium-bearing materials.

Promoters can be continuously added. This may be done to keep the reaction happening in some instances. Different promoter concentrations are tested to determine the critical concentration that can trigger the lithium dissolution reaction, as shown in FIG. 11. In this example, the concentration of 0.1 wt. % of the promoter is needed to trigger the electrochemical leaching. Due to the high leaching potential, Au is selected as the catalyst for it is stable at that potential. Au nanoparticles are electrodeposited in $HAuCl_4$ solution, and the electrode is freeze-dried again to form a porous structure. Loading of Au nanoparticles can be controlled by altering the electrodeposition charge. The optical photo of different carbon-based materials is shown in FIG. 12. SEM image is shown in FIG. 13. The GO flasks are attached to the carbon fiber to conduct electrons and are stabilized by the Nafion binder.

The scale-up electrochemical extraction performance is tested with an as-designed multi-functional current collector, and the electrochemical apparatus.

Figure 14:
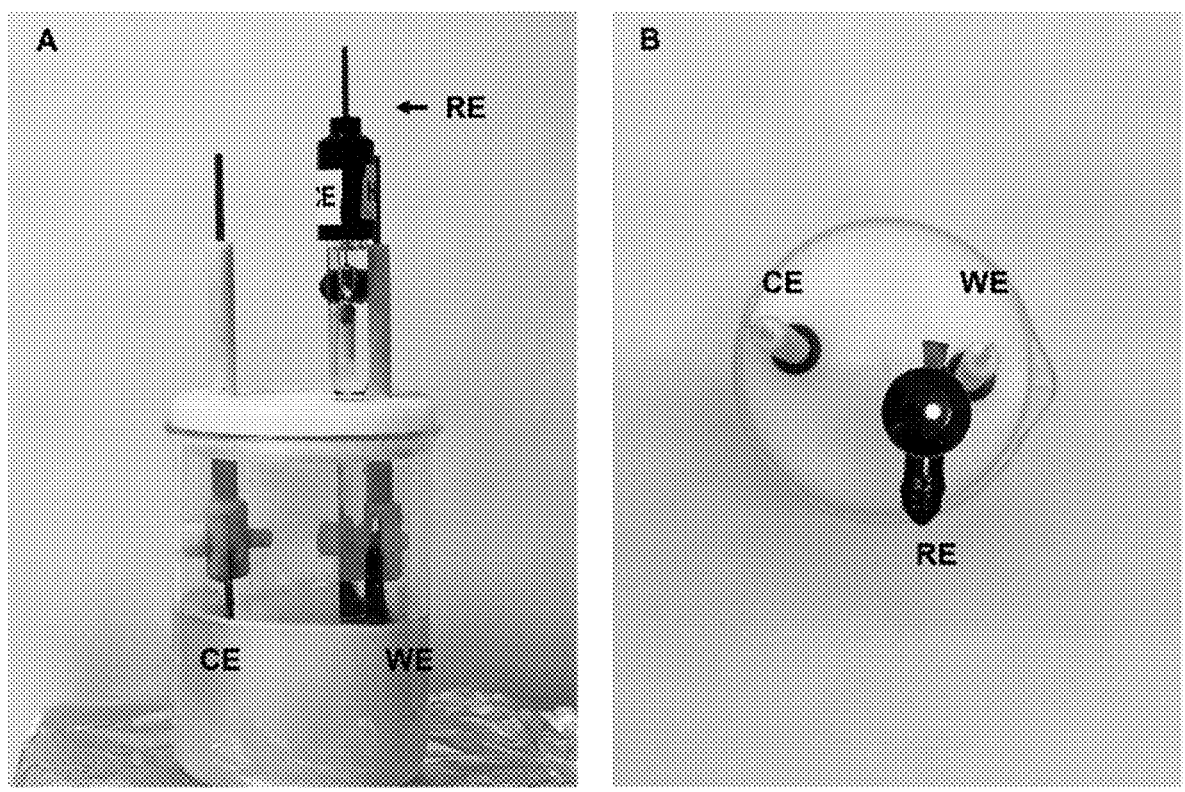
FIG. 14 shows an exemplary electrochemical apparatus to leach lithium from lithium-bearing materials for scale-up production, where the lithium-bearing materials are suspended inside the electrolyte.
Figure 15:
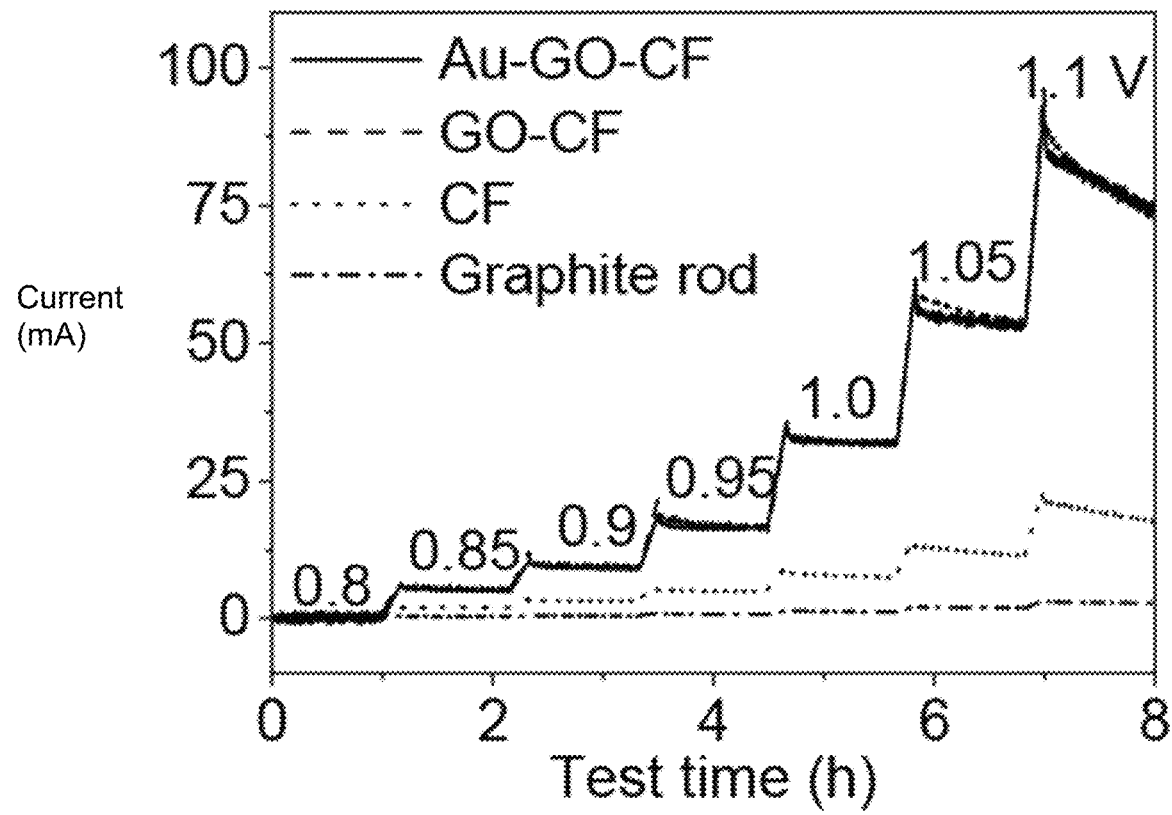
FIG. 15 depicts the current density of the electrochemical leaching as a function of voltage, confirming the as-designed current collector has an enlarged surface area and enhanced current density.

It is shown in FIG. 14. The lithium-bearing materials particles are dispersed inside the liquid electrolyte with a promoter and constantly stirred. The multi-functional current collector shows a much higher current density than other carbon electrodes, indicating an improvement in reaction speed (see FIG. 15). As it can be seen, the multi-functional current collector's current density is four times higher than bare carbon felt and ten times higher than the graphite electrode.

Figure 16:
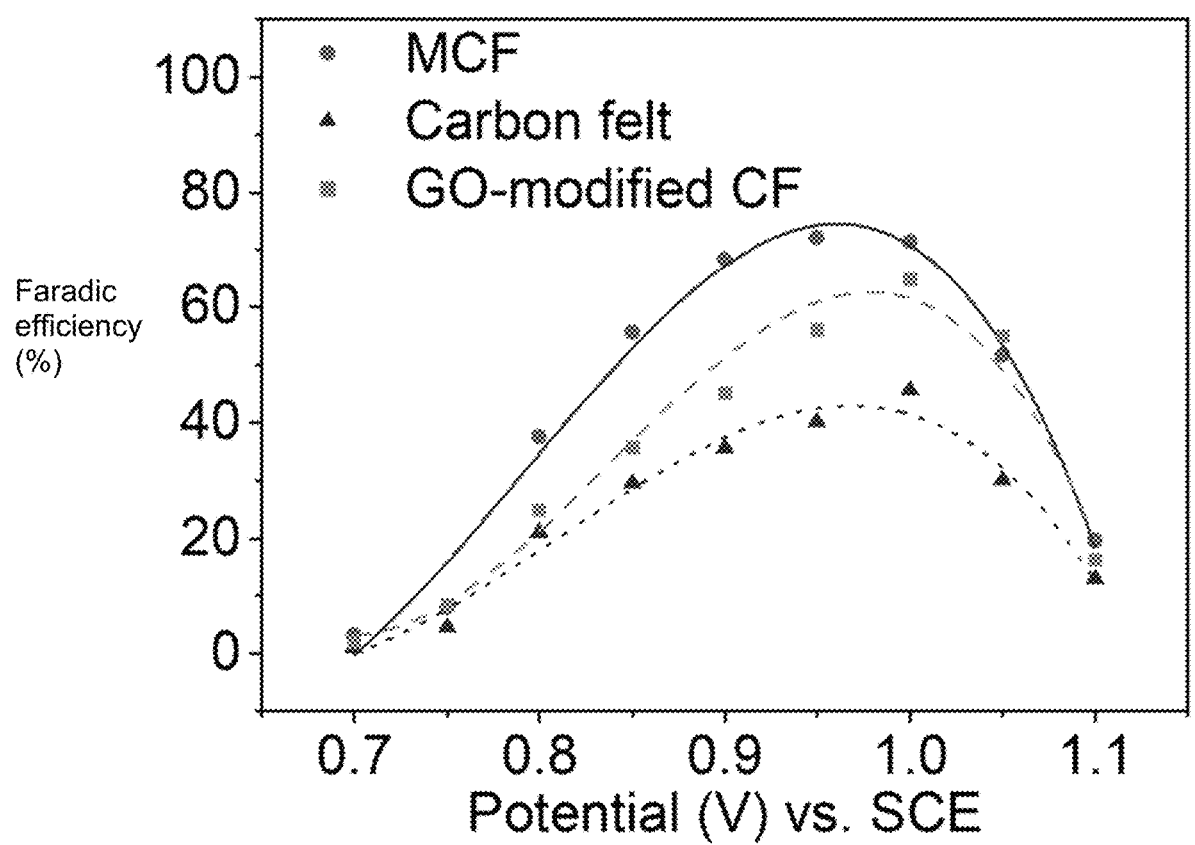
FIG. 16 depicts the faradic efficiency of the electrochemical leaching as a function of voltage, confirming the as-designed current collector enhances faradic efficiency and energy efficiency.
Figure 17:
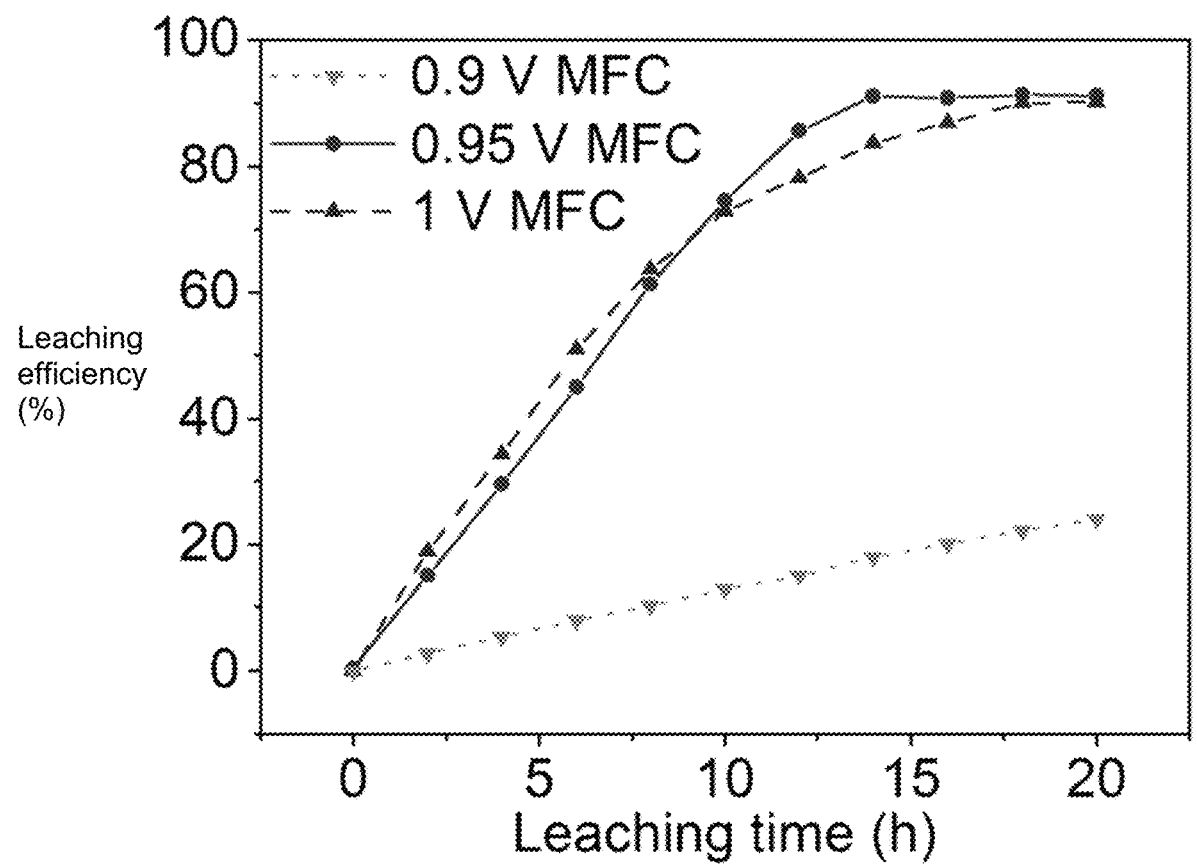
FIG. 17 depicts the leaching efficiency of the electrochemical leaching as a function of voltage and leaching time, confirming the as-designed current collector enhances leaching efficiency and leaching speed.
Figure 18:
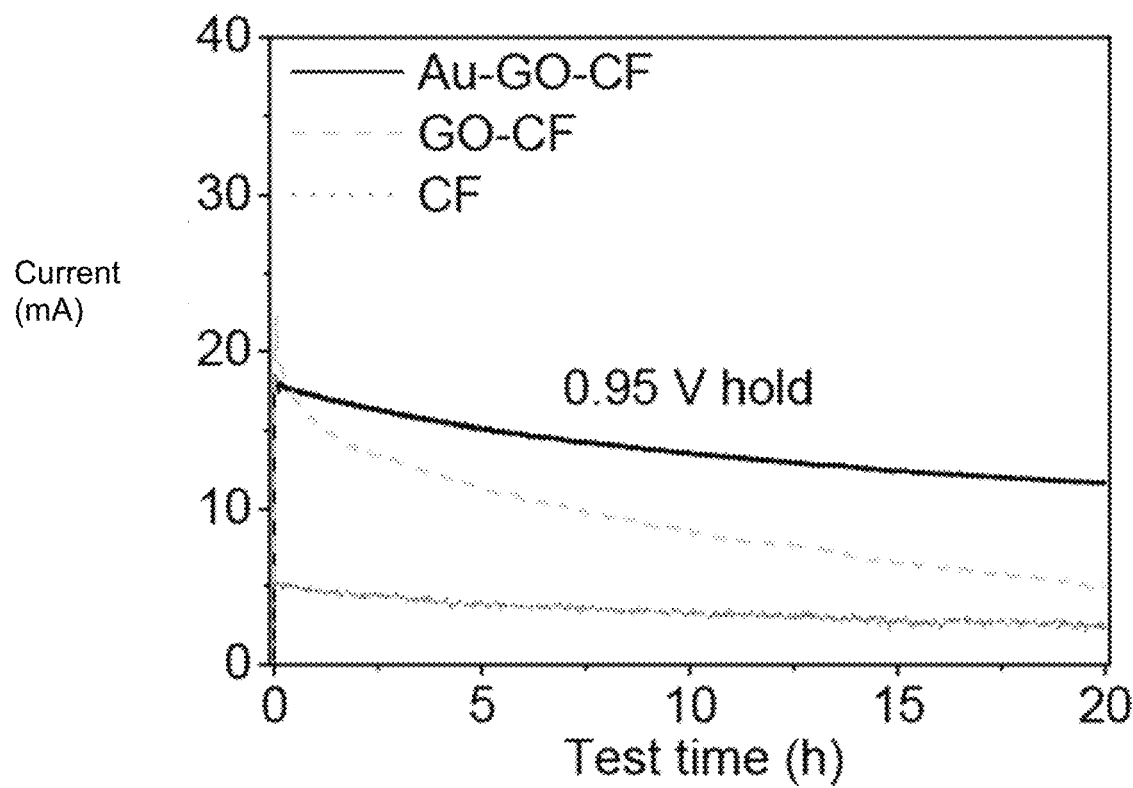
FIG. 18 depicts the leaching efficiency as a function of the leaching potential, confirming the optimized leaching potential of the multi-functional current collector.

The faradic efficiency (FE) of different current collectors (carbon felt, GO-modified carbon felt, and multi-functional current collector) at different leaching potentials are shown in FIG. 16. The multi-functional current collector also significantly improves the faradic efficiency (FE), and a FE of 72% can be achieved. ICP-AES is used to study the Li content in the leachant, and the leaching efficiency is calculated and displaced in FIG. 17. Based on the ICP-AES results, the multi-functional current collector's leaching efficiency is over 90%. And FIG. 17 also proves that the leaching potential significantly influences the leaching speed, where the 0.95 V vs. SCE is the optimized potential. At lower potential, the leaching speed is too slow, while the hydrogen peroxide is consumed quickly at the higher potential. The different current collectors are held at 0.95 V vs. SCE to test the stability (with continuous $O_2$ purging), as shown in the FIG. 18. The GO-modified carbon felt initially show high current density and fast decade rate, showing the promoters are quickly consumed. The current density is maintained for the multi-functional current collector, proving the Au catalysts can generate hydrogen peroxide promoters in-situ.

Figure 19:
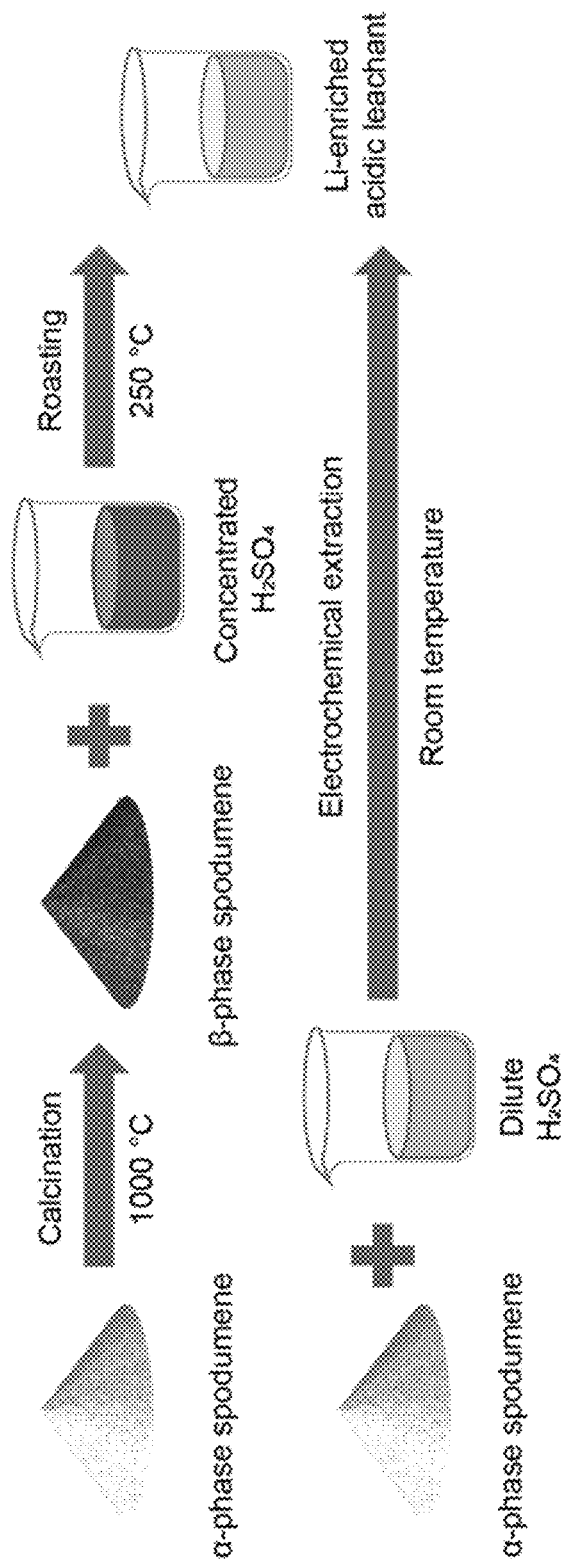
FIG. 19 depicts the flowchart of traditional lithium leaching technology and as-introduced, confirming embodiments of the disclosed technology improves energy efficiency and is environmental-friendly.

The flowcharts of lithium leaching from ores are shown in FIG. 19. The traditional extraction method requires large energy consumption during the (1) phase-transformation calcination and (2) concentrated acid roasting. These two steps require significant energy input and emit tons of greenhouse gas (e.g., $CO_2$). As for the electrochemical leaching technology disclosed here, the energy consumption is significantly lowered because the heating is skipped.

The following references are incorporated herein by reference in their entireties.

[1] X.-G. Yang, T. Liu, C.-Y. Wang, *Nature Energy* 2021, 6, 176-185.

[2] E. A. Olivetti, G. Ceder, G. G. Gaustad, X. Fu, *Joule* 2017, 1, 229-243.

[3] P. Loganathan, G. Naidu, S. Vigneswaran, *Environmental Science: Water Research & Technology* 2017, 3, 37-53.

[4] F. Meng, J. McNeice, S. S. Zadeh, A. Ghahreman, *Mineral Processing and Extractive Metallurgy Review* 2019, 42, 123-141.

[5] B. Tadesse, F. Makuei, B. Albijanic, L. Dyer, *Minerals Engineering* 2019, 131, 170-184.

[6] C. Dessemond, G. Soucy, J.-P. Harvey, P. Ouzilleau, *Minerals* 2020, 10.

[7] A. Y. Fosu, N. Kanari, J. Vaughan, A. Chagnes, *Metals* 2020, 10.

[8] aL. A. Diaz, M. L. Strauss, B. Adhikari, J. R. Klaehn, J. S. McNally, T. E. Lister, *Resources, Conservation and Recycling* 2020, 161; bL. A. Diaz, G. G. Clark, T. E. Lister, *Industrial & Engineering Chemistry Research* 2017, 56, 7516-7524.

[9] S. Lei, Y. Zhang, S. Song, R. Xu, W. Sun, S. Xu, Y. Yang, *ACS Sustainable Chemistry & Engineering* 2021, 9, 7053-7062.

[10] aR. T. Nguyen, L. A. Diaz, D. D. Imholte, T. E. Lister, *Jom* 2017, 69, 1546-1552; bM. L. Strauss, L. A. Diaz, J. McNally, J. Klaehn, T. E. Lister, *Hydrometallurgy* 2021, 206.

[11] K. Liu, S. Yang, F. Lai, H. Wang, Y. Huang, F. Zheng, S. Wang, X. Zhang, Q. Li, *ACS Applied Energy Materials* 2020, 3, 4767-4776.

[12] A. Kumari, Dipali, N. S. Randhawa, S. K. Sahu, *Journal of Cleaner Production* 2021, 309.

[13] J. Noack, N. Roznyatovskaya, T. Herr, P. Fischer, *Angewandte Chemie International Edition* 2015, 54, 9776-9809.

[14] H. Kim, W.-J. Kwak, H.-G. Jung, Y.-K. Sun, *Journal of Materials Chemistry A* 2020, 8, 5622-5628.

[15] Z. Liang, Y. C. Lu, *J Am Chem Soc* 2016, 138, 7574-7583.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

It is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of the device and methods of making and using the same have been discussed and illustrated herein, it is to be distinctly understood that the invention is not limited thereto but may be otherwise variously embodied and practiced within the scope of the following claims.

What is claimed is:

1. A method for leaching lithium via an electrochemical apparatus including: a multi-functional current collector; an electrode; an electrolyte; and a lithium-bearing material, wherein the lithium-bearing material is dispersed or suspended in the electrolyte or the lithium-bearing material is coated onto the current collector, the method comprising:

applying voltage to the current collector to leach lithium from the lithium-bearing material; and ex-situ adding an oxidant promoter to the electrolyte to increase the amount or rate of electron conduction and/or to lower the reaction potential of the electrochemical apparatus;

wherein the lithium-bearing material includes α-spodumene, β-spodumene, lepidolite, hectorite, jadarite, petalite, eucryptite, zinnwaldite, lithiophilite, triphylite, amblygonite, Li-enriched clay, and/or Li-bearing waste stream from mining or processing of coal, coal by-product, coal mineral, oil shale, coal underclay, and/or coal overburden.

2. The method of claim 1, wherein:
ex-situ adding the oxidant promoter improves energy efficiency of the electrochemical apparatus.

3. The method of claim 1, wherein:
the oxidant promoter includes $O_2$, $O_3$, $H_2O_2$, $HNO_3$, $F_2$, $Cl_2$, $Br_2$, $I_2$, $ClO^-$, $S_2O_8^{2-}$, $SO_5^{2-}$, $KMnO_4$, $N_2O$, $NO_2$, and/or $SO_2$.

4. The method of claim 1, further comprising:
in-situ forming of an oxidant promoter with assistance from a catalyst and an oxygen gas to increase the amount or rate of electron conduction and/or to lower the reaction potential of the electrochemical apparatus.

5. The method of claim 4, wherein:
in-situ forming of the oxidant promoter improves energy efficiency of the electrochemical apparatus.

6. The method of claim 4, wherein:
the oxidant promoter includes $O_2$, $O_3$, $H_2O_2$, $HNO_3$, $F_2$, $Cl_2$, $Br_2$, $I_2$, $ClO^-$, $S_2O_8^{2-}$, $SO_5^{2-}$, $KMnO_4$, $N_2O$, $NO_2$, and/or $SO_2$.

7. The method of claim 1, wherein:
the electrolyte includes any one or a combination of $H_2SO_4$, $H_2SO_3$, $H_2S_2O_8$, HI, HIO, HF, HBr, HBrO, $HIO_3$, $H_3PO_4$, $H_3AsO_4$, $H_3BO_3$, $KMnO_4$, $HNO_3$, HTFSI Bis(trifluoromethane)sulfonimide), HCl, HClO, $HClO_2$, $HClO_3$, $HClO_4$, $CH_2ClCO_2H$ (Chloroacetic acid), $H_3C_6H_5O_7$ (Citric acid), $H_2O_2$, NaOH, $Na_2CO_3$, $NaHCO_3$, NaCl, $Na_2S_2O_8$, NaClO, $Na_2HPO_4$, KCl, $K_2S_2O_8$, KClO, and/or $KH_2PO_4$ in a water solvent or an organic solvent.

8. The method of claim 7, wherein:
the organic solvent includes $LiPF_6$ in ethylene carbonate, propylene carbonate, dimethyl carbonate, ethyl methyl carbonate and diethyl carbonate and/or LiTFSI (Lithiumbis(trifluoromethanesulfonyl)imide) in 1,3-dioxolane, tetrahydrofuran, diethylene glycol dimethyl ether, triethylene glycol dimethyl ether, tetraethylene glycol dimethyl ether and 1,2-dimethoxyethane.

9. The method of claim 8, wherein:
the electrolyte includes a lithium salt.

10. The method of claim 9, wherein:
the lithium salt includes $LiPF_6$, LiTFSI (Lithiumbis(trifluoromethanesulfonyl)imide), LiFSI (Lithium bis(fluorosulfonyl)imide), Lithium triflate, $LiBF_4$, $LiClO_4$, $LiAsF_6$, $LiNO_3$, or combinations thereof, dissolved in an organic solvent.

11. The method of claim 10, wherein:
the organic solvent includes one or more carbonate-based solvents, one or more ether-based solvents, one or more diluents, or mixtures thereof.

12. The method of claim 11, wherein:
the one or more carbonate-based solvents includes ethylene carbonate, propylene carbonate, dimethyl carbonate or diethyl carbonate;

the one or more ether-based solvents includes 1,3-dioxolane, tetrahydrofuran, diethylene glycol dimethyl ether, triethylene glycol dimethyl ether, tetraethylene glycol dimethyl ether or 1,2-dimethoxyethane; and the one or more diluents includes 1,1,2,2-tetrafluoroethyl-2,2,3,3-tetrafluoropropyl ether (TTE) and Bis(2,2,2-trifluoroethyl) ether (BTFE).

* * * * *